United States Patent
Jang

(10) Patent No.: US 7,881,015 B2
(45) Date of Patent: Feb. 1, 2011

(54) OVERPASS STRUCTURE OF FLEXIBLE PRINTED CABLE (FPC) SIGNAL LINES WITH SUSPENSION SIGNAL LINES FOR A HARD DISK DRIVE

(75) Inventor: Eunkyu Jang, San Jose, CA (US)

(73) Assignee: Samsung Electronics Co., Ltd., Suwon City (KR)

( * ) Notice: Subject to any disclaimer, the term of this patent is extended or adjusted under 35 U.S.C. 154(b) by 886 days.

(21) Appl. No.: 11/824,037

(22) Filed: Jun. 29, 2007

(65) Prior Publication Data

US 2009/0002888 A1   Jan. 1, 2009

(51) Int. Cl.
*G11B 5/48* (2006.01)
(52) U.S. Cl. .................................. 360/245.9
(58) Field of Classification Search ............. 360/245.9, 360/246, 234.5
See application file for complete search history.

(56) References Cited

U.S. PATENT DOCUMENTS

| | | | | |
|---|---|---|---|---|
| 5,737,152 A | * | 4/1998 | Balakrishnan | 360/245.9 |
| 5,754,369 A | * | 5/1998 | Balakrishnan | 360/264.2 |
| 5,805,382 A | * | 9/1998 | Lee et al. | 360/244.1 |
| 5,995,328 A | * | 11/1999 | Balakrishnan | 360/245.9 |
| 6,025,988 A | * | 2/2000 | Yan | 361/679.37 |
| 6,351,351 B1 | * | 2/2002 | Takasugi | 360/245.9 |
| 6,424,499 B1 | * | 7/2002 | Balakrishnan et al. | 360/245.9 |
| 6,833,694 B2 | | 12/2004 | Ikekame | |
| 7,154,725 B2 | | 12/2006 | Chloupek et al. | |
| 7,606,003 B2 | * | 10/2009 | Amemiya et al. | 360/246 |

OTHER PUBLICATIONS

Jang, Eunkyu, Effects of the Suspension Interconnect on ESD Failures of the Head Stack Assemblies, IEEE Transactions on Magnetics, vol. 40, No. 1, Jan. 2004.

* cited by examiner

*Primary Examiner*—Angel A. Castro
(74) *Attorney, Agent, or Firm*—Ben J. Yorks; Irell & Manella LLP

(57) ABSTRACT

A printed circuit that connects a head to a pre-amplifier circuit of a hard disk drive. The head has a pair of write bond pads and a pair of read bond pads. The printed circuit has a pair of read traces located in a first layer and connected to the read bond pads. The printed circuit also has a pair of write traces that are located in a second layer and connected to the write bond pads. The write traces cross with the read traces so that a head fabricated from a single head wafer can be used as a Up head in a hard disk drive.

8 Claims, 4 Drawing Sheets

OVERPASS STRUCTURE OF FLEXIBLE PRINTED CABLE (FPC) SIGNAL LINES WITH SUSPENSION SIGNAL LINES FOR A HARD DISK DRIVE

BACKGROUND OF THE INVENTION

1. Field of the Invention

The present invention relates to a printed circuit that connects a pre-amplifier circuit to a head of a hard disk drive.

2. Background Information

Hard disk drives contain a plurality of magnetic heads that are coupled to rotating disks. The heads can magnetize and sense the magnetic fields of the disk to write and read data, respectively. The heads each have an air bearing surface that cooperates with a flow of air generated by the rotating disk to create an air bearing. The air bearing prevents mechanical wear between the head and the disk.

To facilitate formation of the air bearing the head is typically attached to a gimbal that pivots about a flexure arm. The flexure arm is cantilevered from the end of an actuator arm. The actuator arm has a voice coil motor that moves the heads across the surfaces of the disks.

The output signals of the heads are amplified by a pre-amplifier circuit of the drive. The pre-amplifier circuit is connected to the heads by wires and/or flexible circuits that are attached to the flexures. The flexible circuits have conductive traces that connect designated bond pads of the heads to corresponding lines of a pre-amplifier circuit assembly.

Hard disk drives have been conventionally assembled to have a head ("Dn head") on a top surface of a disk and a head ("Up head") of a bottom surface of the disk. FIG. 1 schematically shows Dn 1 and Up 2 heads relative to a disk 3. Each head 1 and 2 has a plurality of bond pads 4 labeled H, W−, W+, R−, R+ and G. The W and R pads are connected to the write and read elements of the heads, respectively. The G pad is ground and the H pad is connected to a fly on demand element of the head. It is desirable to have the head pads aligned when assembled in a disk drive.

The heads are typically fabricated in wafer form. Each wafer has both Up and Dn heads. The Up and Dn heads are fabricated to have mirror image bond pad patterns so that when the Dn heads are assembled the pads arrangements are the same as shown in FIG. 1.

There have been developed disk drives that use only a single head. To reduce cost and the complexity of inventory the heads are fabricated on wafers so that all the heads have the same bond pad pattern. When such heads are used, the bond pad pattern of the Up heads become misaligned with the corresponding bond patterns of the Dn heads 1 as shown in FIG. 2. The bond pads of the heads and or pre-amplifier circuit assembly can be changed, but this would increase process time and cost. It would be desirable to convert a head from a single head wafer into a Up head without changing the bond pad arrangements of the head or pre-amplifier circuit.

BRIEF SUMMARY OF THE INVENTION

An apparatus to connect a head to a pre-amplifier circuit of a hard disk drive. The head has a pair of write bond pads and a pair of read bond pads. The apparatus is a printed circuit that has a pair of read traces located in a first layer and connected to the read bond pads. The printed circuit also has a pair of write traces that are located in a second layer and connected to the write bond. The write traces cross over the read traces.

DETAILED DESCRIPTION

Disclosed is a printed circuit that connects a head to a pre-amplifier circuit of a hard disk drive. The head has a pair of write bond pads and a pair of read bond pads. The printed circuit has a pair of read traces located in a first layer and connected to the read bond pads. The printed circuit also has a pair of write traces that are located in a second layer and connected to the write bond pads. The write traces cross with the read traces so that a head fabricated from a single head wafer can be used as a Up head in a hard disk drive.

Figure 1:
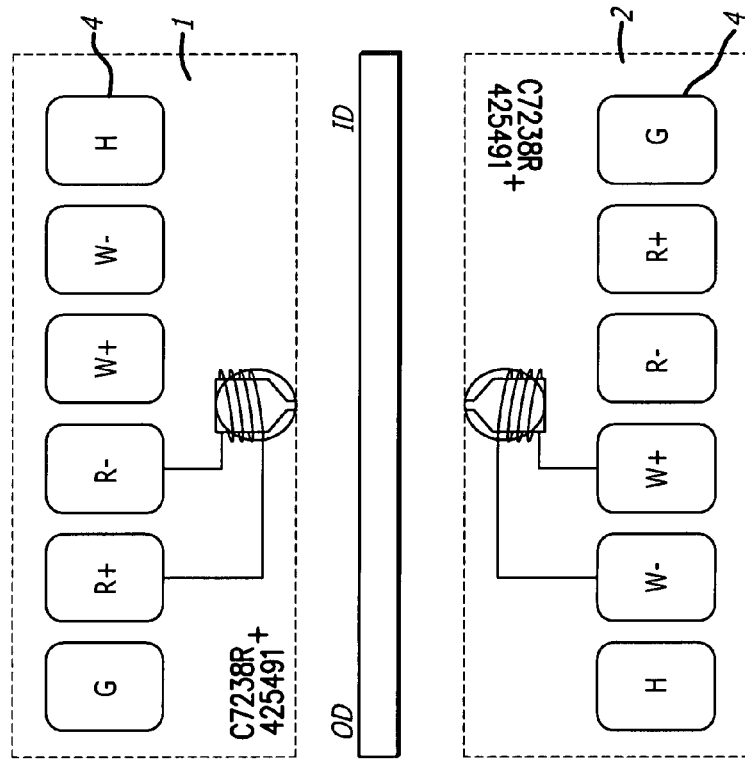
FIG. 1 is an illustration showing bond pads of an Up head and a Dn head of the prior art.
Figure 2:
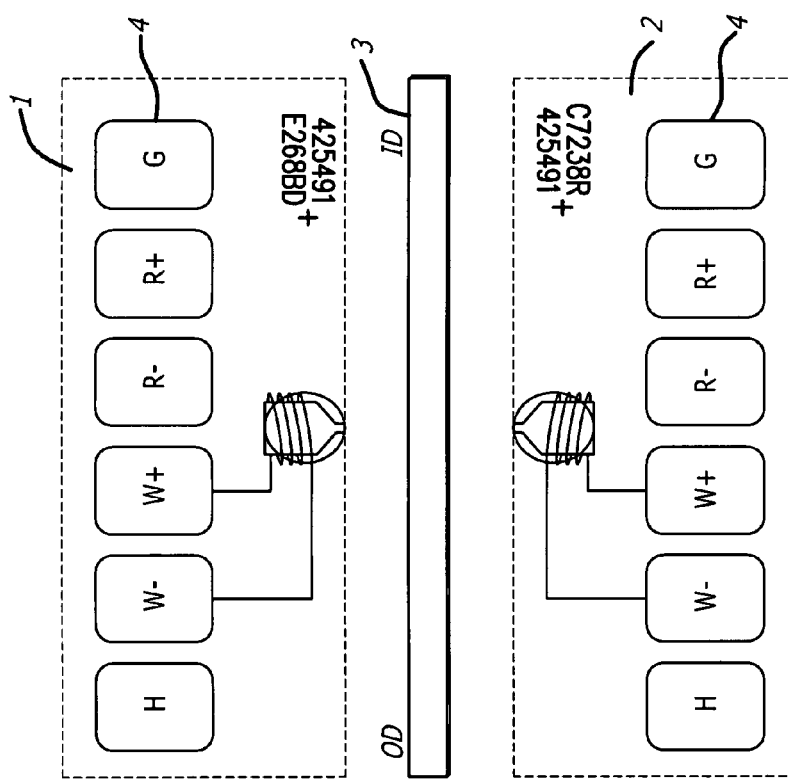
FIG. 2 is an illustration showing bond pads where a head from a single head wafer of the prior art is used as a Up head.
Figure 3:
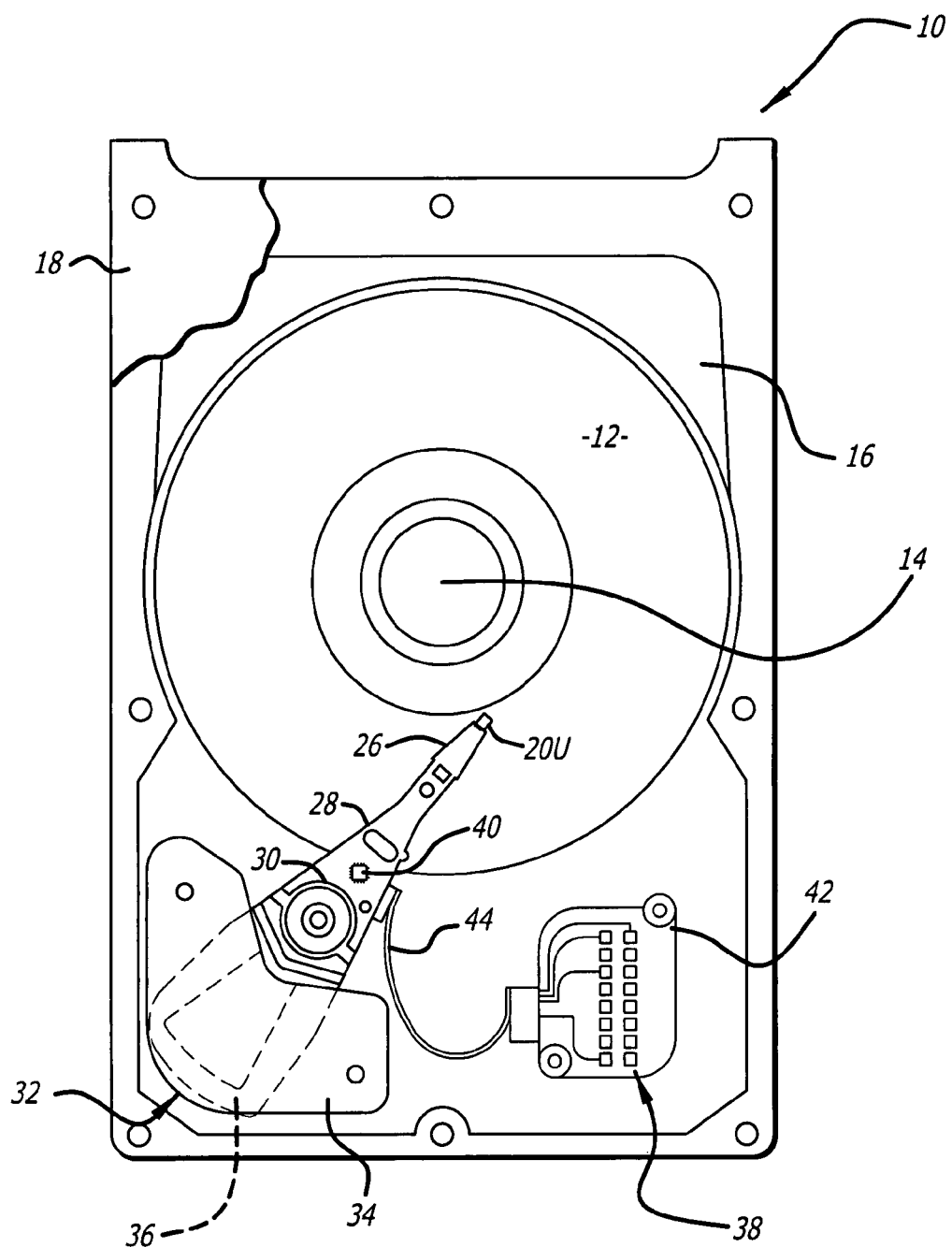
FIG. 3 is a top view of an embodiment of a hard disk drive.

Referring to the drawings more particularly by reference numbers, FIG. 3 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. There is an Up head 20U and a down head 20D. Each head 20 may have separate write (not shown) and read elements (not shown). Although one disk 12 and two heads 20 are shown and described, it is to be understood that the disk drive 10 may have multiple disks 12 and heads 20U and 20D (see FIG. 4).

The heads 20 are gimbal mounted to a corresponding flexure arm 26. The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a pre-amplifier circuit 40 coupled to a printed circuit board 42. The pre-amplifier circuit is electronically connected to the heads 20 by a printed circuit 44.

Figure 4:
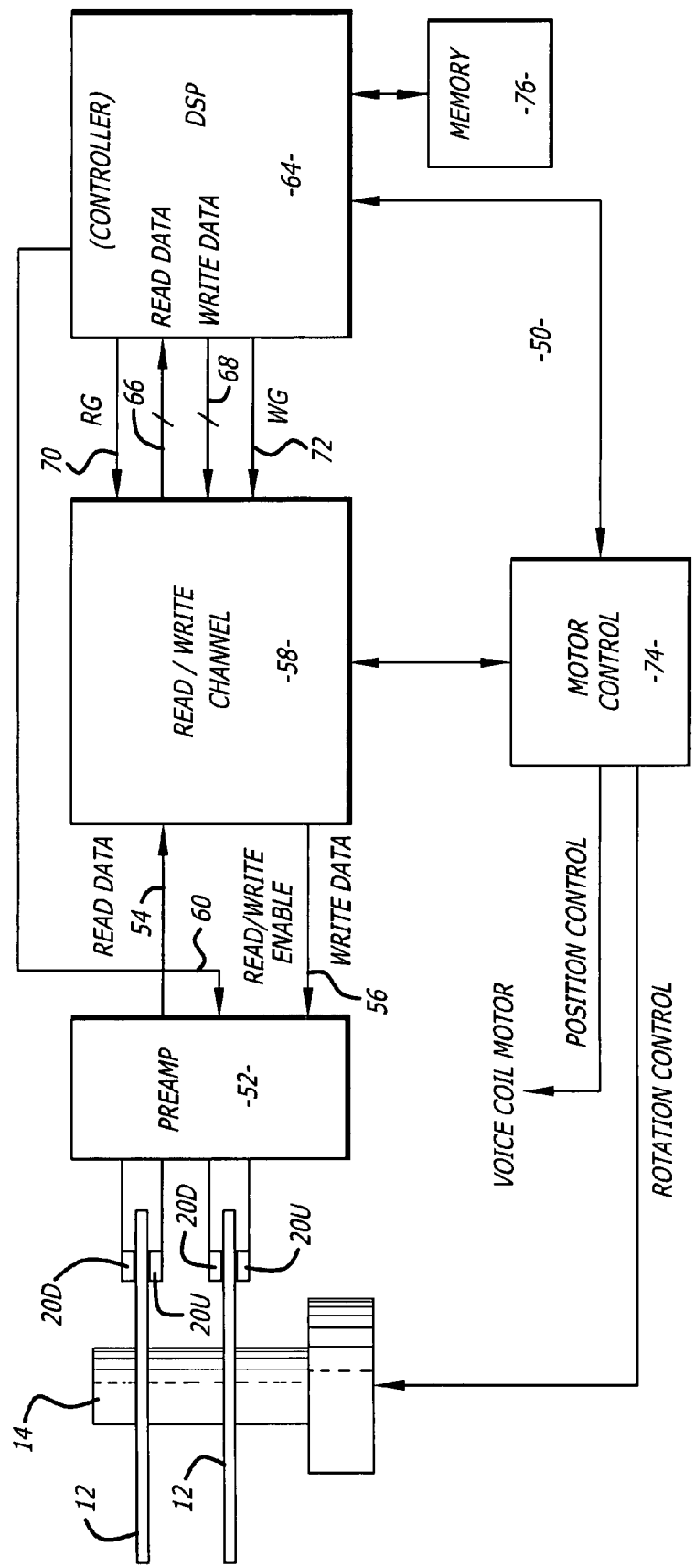
FIG. 4 is a schematic of an electrical circuit for the hard disk drive.

FIG. 4 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a firmware and/or software routine(s), including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the firmware and/or software routine(s) performed by the controller.

Figure 5:
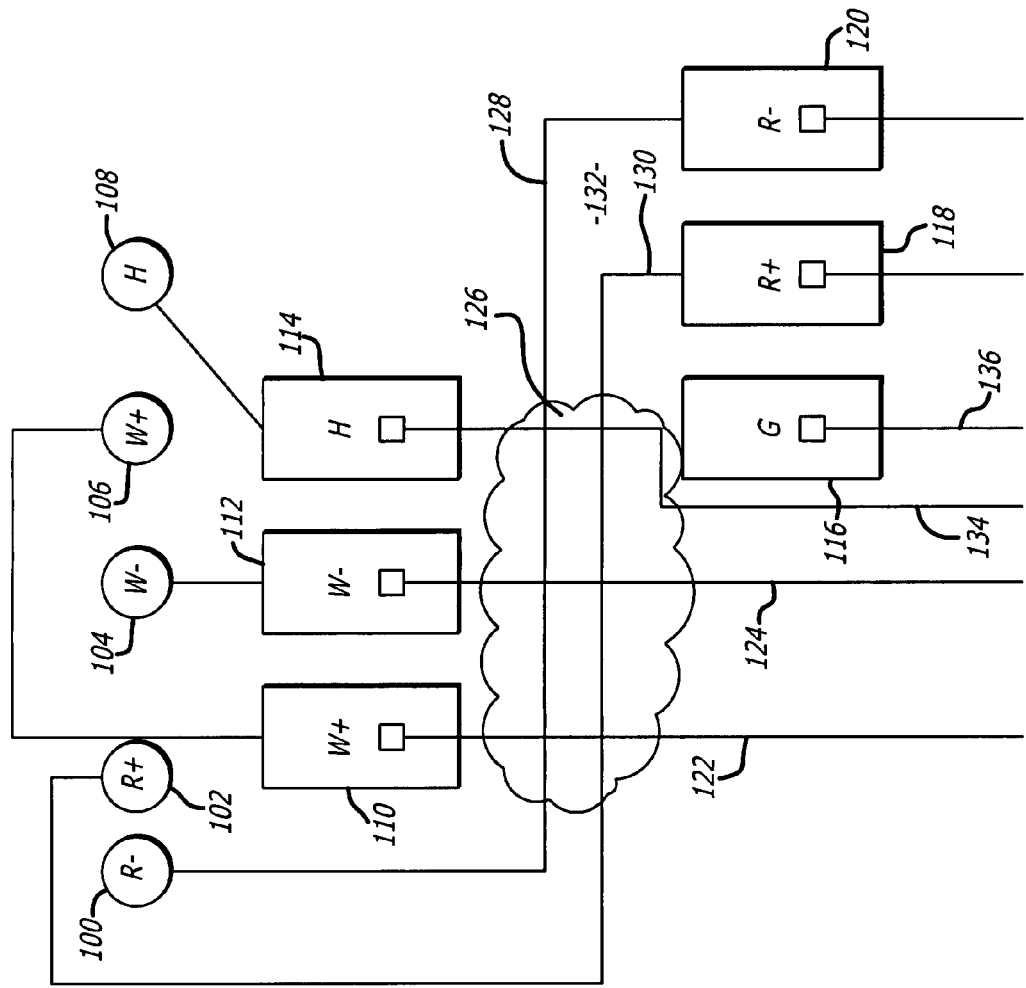
FIG. 5 is a schematic showing the conductive traces of a printed circuit board of the disk drive.

FIG. 5 shows a wiring schematic of the printed circuit 44. The printed circuit may be a flexible printed circuit board constructed with polyimide and metal traces as is known in the art. The printed circuit 44 has pads 100, 102, 104, 106 and 108 on the pre-amplifier side of the circuit 44 and pads 110, 112, 114, 116, 118 and 120 on the suspension side of the circuit 44. Pads 100 and 102 of the pre-amplifier, and pads 118 and 120 of the suspension bonding pads are connected to a head read element of a head. Pads 104 and 106, and 110 and 112 are connected to a head write element. Pads 108 and 114 are connected to a fly on demand element of the head. Pad 116 is a ground pad.

The printed circuit 44 includes a pair of write traces 122 and 124 that are connected to pads 104, 106, 110 and 112. The write traces 122 and 124 are located within a second layer along with the FOD trace 126. The circuit 44 also includes a pair of read traces 128 and 130 that are connected to pads 100, 102, 118 and 120. The read traces are located within a first layer 132 of the circuit. The circuit 44 further has a fly on demand trace 134 that is connected to pads 108 and 114, and a ground trace 136 connected to pad 116.

The write traces 122 and 124 cross over the read traces 128 and 130 to connect write pads 104 and 106 of the pre-amplifier circuit with the write pads 122 and 124 of the head without having to rearrange the order of the pads on either the pre-amplifier circuit or head. This allows a head fabricated from a single head wafer to be used as a Up head in a multi-head disk drive. The write traces 124 and 126 can cross over the read traces 128 and 130 at essentially a right angle to minimize cross-talk between the traces.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a base plate;
   a disk coupled to said base plate;
   an actuator arm coupled to said base plate;
   a flexure attached to said actuator arm;
   a head coupled to said flexure, said head having a pair of write bond pads and a pair of read bond pads, said head includes a fly on demand bond pad;
   a printed circuit that has a pair of read traces located in a first layer and connected to said read bond pads, and a pair of write traces that are; located in a second layer, are connected to said write bond pads, and cross said read traces, said printed circuit includes a fly on demand trace that is connected to said fly on demand bond pad; and,
   a pre-amplifier circuit coupled to said head by said printed circuit.

2. The disk drive of claim 1, wherein said write and read traces cross at essentially a right angle.

3. The disk drive of claim 1, wherein said printed circuit is a flexible printed circuit board.

4. An apparatus to connect a head to a pre-amplifier circuit of a hard disk drive, the head has a pair of write bond pads and a pair of read bond pads, comprising:
   a printed circuit that has a pair of read traces located in a first layer and connected to the write bond pads, and a pair of write traces that are located in a second layer, are connected to the write bond pads, and cross said read traces, the head has a fly on demand bond pad and said printed circuit includes a fly on demand trace that is connected to the fly on demand bond pad.

5. The apparatus of claim 4, wherein said write and read traces cross at essentially a right angle.

6. The apparatus of claim 4, wherein said printed circuit is a flexible printed circuit board.

7. A method for connecting a pre-amplifier circuit to a head of a hard disk drive, the head has a pair of write bond pads and a pair of read bond pads, comprising:
   providing a printed circuit that has a pair of read traces located in a first layer, and a pair of write traces located in a second layer and cross the read traces;
   attaching the write traces of the printed circuit to the write bond pads of the head and the read traces of the printed circuit to the read bond pads of the head;
   attaching a fly on demand trace of the printed circuit to a fly on demand bond pad of the head; and,
   connecting the printed circuit to a pre-amplifier circuit.

8. The method of claim 7, wherein the write and read traces cross at essentially a right angle.

* * * * *